US011172275B2

(12) United States Patent
Testa et al.

(10) Patent No.: US 11,172,275 B2
(45) Date of Patent: Nov. 9, 2021

(54) OPTICAL SWITCHING APPARATUS AND METHODS

(71) Applicant: Telefonaktiebolaget LM Ericsson (publ), Stockholm (SE)

(72) Inventors: Francesco Testa, Pisa (IT); Claudio Oton, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/635,327

(22) PCT Filed: Aug. 9, 2017

(86) PCT No.: PCT/EP2017/070228
§ 371 (c)(1),
(2) Date: Jan. 30, 2020

(87) PCT Pub. No.: WO2019/029805
PCT Pub. Date: Feb. 14, 2019

(65) Prior Publication Data
US 2020/0169794 A1 May 28, 2020

(51) Int. Cl.
*H04Q 11/00* (2006.01)
*G02B 6/293* (2006.01)
*H04J 14/02* (2006.01)

(52) U.S. Cl.
CPC ..... *H04Q 11/0005* (2013.01); *G02B 6/29302* (2013.01); *G02B 6/29338* (2013.01);
(Continued)

(58) Field of Classification Search
CPC ....... H04Q 11/0005; H04Q 2011/0015; H04Q 2011/0016; H04Q 2011/0035;
(Continued)

(56) References Cited

U.S. PATENT DOCUMENTS

2015/0215066 A1\* 7/2015 Testa ................ H04J 14/06
398/48

FOREIGN PATENT DOCUMENTS

WO 2013182246 A1 12/2013

OTHER PUBLICATIONS

Kamchevska, V. et al., "Experimental Demonstration of Multidimensional Switching Nodes for All-Optical Data Center Networks", Journal of Lightwave Technology, vol. 34 No. 8, Apr. 15, 2016, pp. 1837-1843, IEEE.

(Continued)

*Primary Examiner* — Leslie C Pascal
(74) *Attorney, Agent, or Firm* — Coats & Bennett, PLLC

(57) ABSTRACT

Methods and apparatus are provided for switching an optical signal. In one aspect, an optical switching apparatus comprises a first beam splitting apparatus configured to split a first optical input signal into first and second optical signals, wherein the first optical signal has substantially the same polarization state as the second optical signal. The apparatus also comprises a switching matrix comprising a plurality of first outputs of the switching matrix and a plurality of second outputs of the switching matrix, each first output of the switching matrix associated with a respective one of the second outputs of the switching matrix, the switching matrix configured to selectively direct the first optical signal to a selected one of the first outputs of the switching matrix and to selectively direct the second optical signal to the second output of the switching matrix associated with the selected first output of the switching matrix. The apparatus further comprises a plurality of beam combining apparatus, each beam combining apparatus configured to combine optical signals from a respective one of the first outputs of the switching matrix and its associated second output of the switching matrix.

11 Claims, 8 Drawing Sheets

(52) U.S. Cl.
CPC ...... *H04J 14/0201* (2013.01); *H04J 14/0209* (2013.01); *H04J 14/0212* (2013.01); *H04J 14/0217* (2013.01); *H04Q 2011/0015* (2013.01); *H04Q 2011/0016* (2013.01); *H04Q 2011/0035* (2013.01); *H04Q 2011/0058* (2013.01)

(58) Field of Classification Search
CPC .......... H04Q 2011/0058; H04J 14/0212; H04J 14/0217; H04J 14/0209; H04J 14/0201; G02B 6/29302; G02B 6/29338
See application file for complete search history.

(56) References Cited

OTHER PUBLICATIONS

Chen, K. et al., "OSA: An Optical Switching Architecture for Data Center Networks With Unprecedented Flexibility", IEEE/ACM Transactions on Networking, vol. 22 No. 2, Apr. 1, 2014, pp. 498-511, IEEE.

International Telecommunciation Union, "Series G: Transmission Systems and Media, Digital Systems and Networks: Optical System Design and Engineering Considerations", ITU-T Telecommunication Standardization Sector of ITU, Series G, Supplement 39, Sep. 1, 2012, pp. 1-118, ITU.

Tanizawa, K. et al., "4×4 Si-Wire Optical Path Switch with Off-Chip Polarization Diversity", 2015 Opto-Electronics and Communications Conference (OECC), Jun. 28, 2015, pp. 1-3, IEEE.

Yuang, M. et al., "OPMDC: Architecture Design and Implementation of a New Optical Pyramid Data Center Network", Journal of Lightwave Technology, vol. 33 No. 10, May 15, 2015, pp. 2019-2031, IEEE.

Saridis, G. et al., "Lightness: A Function-Virtualizable Software Defined Data Center Network With All-Optical Circuit/Packet Switching", Journal of Lightwave Technology, vol. 34 No. 7, Apr. 1, 2016, p. 1618-1627, IEEE.

Suzuki, K. et al., "Polarization-Diversity 4×4 Si-Wire Optical Switch", International Conference on Photonics in Switching 2015—Optical Switching Technology & Devices (Topic 1), Sep. 22, 2015, pp. 121-123, IEEE.

Han, S. et al., "50×50 Polarization-Insensitive Silicon Photonic MEMS Switches: Design and Experiment", 42nd European Conference and Exhibition on Optical Communications (ECOC 2016)—Post Deadline, Sep. 18, 2016, pp. 13-15, IEEE.

Testa, F. et al., "Design and Implementation of an Integrated Reconfigurable Silicon Photonics Switch Matrix in IRIS Project", IEEE Journal of Selected Topics in Quantum Electronics, vol. 22 No. 6, Nov. 1, 2016, pp. 1-14, IEEE.

\* cited by examiner

OPTICAL SWITCHING APPARATUS AND METHODS

TECHNICAL FIELD

Examples of the present disclosure relate to optical switching apparatus, optical add drop multiplexers, and optical switching methods.

BACKGROUND

Wavelength division multiplexing (WDM) optical communication networks include switching devices to allow individual optical signals to be added to an optical fiber, and/or removed from an optical fiber. An add drop and switching aggregator (ADSA), for example, allows one or more individual optical signals to be redirected from an aggregated WDM optical signal to a particular port, and/or allows one or more individual optical signals provided to one or more ports to be added to the aggregated WDM optical signal.

SUMMARY

One aspect of the present disclosure provides an optical switching apparatus comprising a first beam splitting apparatus configured to split a first optical input signal into first and second optical signals, wherein first optical signal has substantially the same polarization state as the second optical signal. The apparatus also comprises a switching matrix comprising a plurality of first outputs of the switching matrix and a plurality of second outputs of the switching matrix, each first output of the switching matrix associated with a respective one of the second outputs of the switching matrix, the switching matrix configured to selectively direct the first optical signal to a selected one of the first outputs of the switching matrix and to selectively direct the second optical signal to the second output of the switching matrix associated with the selected first output of the switching matrix. The apparatus further comprises a plurality of beam combining apparatus, each beam combining apparatus configured to combine optical signals from a respective one of the first outputs of the switching matrix and its associated second output of the switching matrix.

A further aspect of the present disclosure provides an optical add drop multiplexer comprising a first optical switching apparatus according to the above aspect, and a second optical switching apparatus according to the above aspect. Each beam combining apparatus of the first optical switching apparatus is arranged to combine the optical signals from the respective one of the first outputs of the switching matrix and its associated second output of the switching matrix to provide optical input signals for the second optical switching apparatus.

An additional aspect of the present disclosure provides a method of switching optical signals. The method comprises receiving a first optical input signal, and splitting the first optical input signal into first and second optical signals with substantially the same polarization state. The first and second optical signals are then provided to a switching matrix comprising a plurality of first outputs of the switching matrix and a plurality of second outputs of the switching matrix, each first output of the switching matrix associated with a respective one of the second outputs of the switching matrix. The method comprises selectively directing the first optical signal to a selected one of the first outputs of the switching matrix using the switching matrix, and selectively directing the second optical signal to the second output of the switching matrix associated with the selected first output of the switching matrix using the switching matrix. The method comprises directing the first optical signal from the selected one of the first outputs of the switching matrix to a selected one of a plurality of beam combining apparatus, directing the second optical signal from the second output of the switching matrix associated with the selected first output of the switching matrix to the selected beam combining apparatus, and combining the first and second optical signals at the selected beam combining apparatus.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

An add drop switching architecture (ADSA) implementation may include a switching matrix that is polarization sensitive. That is, due to the particular construction of the switching matrix, the switching matrix may operate on components of an optical signal having one polarization state, while operating with reduced sensitivity on other optical components, or even being completely insensitive to the other optical components. For example, the switching matrix may operate on components that have a first polarization state, while having reduced or no ability to operate on components that have a second polarization state, such as a state that is orthogonal or substantially orthogonal to the first polarization state. Therefore, if an optical signal is provided to such a switching matrix, and the optical signal has, for example, a random polarization state or an incoherent polarization state, the switching matrix may operate with reduced sensitivity. That is, the signal power of a signal output from the switching matrix may be lower than a signal output from the switching matrix if the input optical signal is of a single polarization state on which the switching matrix operates with full sensitivity.

Figure 1:
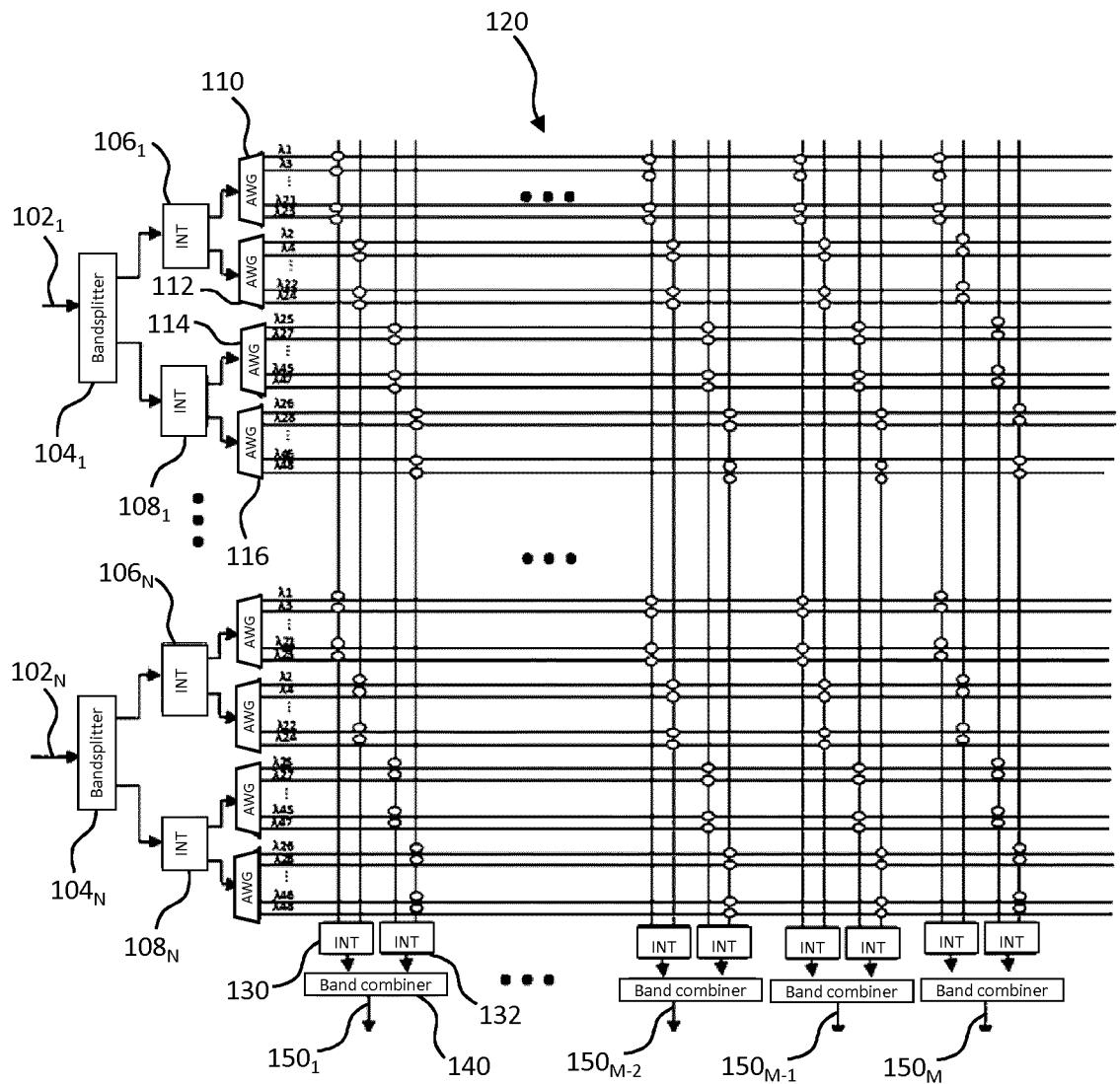
FIG. 1 is a schematic illustration of an example of a drop switch device.

FIG. 1 shows an example of a drop switch device 100, which may be used to drop (i.e. remove or extract) optical signals from one or more wavelength division multiplexing (WDM) optical signals. The device 100 may form part of an add/drop and switching aggregator (ADSA). The device receives a number N of optical input signals at inputs $102_1, \ldots, 102_N$. Each optical input signal is provided to a respective wavelength selective bandsplitter $104_1, \ldots, 104_N$, each of which splits the optical input signal into two signals with respective wavelength ranges. In one example, an optical input signal may comprise 48 wavelengths corresponding to wavelength division multiplexed signals. In this example, each bandsplitter 104 splits the respective optical input signal into two signals, one corresponding to wavelengths 1 to 24, and the other corresponding to wavelengths 25 to 48. The wavelengths may be numbered so as to be contiguous or adjacent.

The outputs from each bandsplitter 104 are provided to respective wavelength selective routing devices $106_1, \ldots, 106_N$ and $108_1, \ldots, 108_N$. For example, the two optical signals output from the first bandsplitter $104_1$ are provided to routing devices $106_1$ and $108_1$ respectively. Each routing device 106, 108 provides a first output comprising odd numbered wavelengths of the respective optical input signal 102 and a second output comprising even numbered wavelengths of the respective optical input signal 102. The outputs of the routing devices are provided to respective demultiplexers. For example, the two outputs of routing device $106_1$ are provided to demultiplexers 110 and 112 respectively. Similarly, the two outputs of routing device $108_1$ are provided to demultiplexers 114 and 116 respectively.

Each demultiplexer multiplexes its input signal to provide a plurality of output signals, each of which corresponds to one of the wavelengths of the respective optical input signal 102. In one example, where the optical input signals 102 each include 48 wavelengths, the demultiplexers, such as demultiplexers 110 and 112, each output twelve signals. Therefore, for example, demultiplexer 110 may output signals corresponding to odd numbered wavelengths 1, 3, ..., 23 of the optical input signal $102_1$, demultiplexer 112 may output signals corresponding to even numbered wavelengths 2, 4, ..., 24, demultiplexer 114 may output signals corresponding to odd numbered wavelengths 25, 27, ..., 47, and demultiplexer 116 may output signals corresponding to even numbered wavelengths 26, 28, ..., 48.

In this way, each optical input signal is split into separate optical signals, each corresponding to a signal of a particular wavelength in the optical input signal 102. In other examples, there may be more or fewer wavelengths or WDM signals in the optical input signal, resulting in more or fewer outputs from the multiplexers, and/or other apparatus may be used to separate the optical input signals into separate WDM signals.

The separated WDM optical signals are provided to a switching matrix 120. The switching matrix 120 comprises a plurality of optical waveguides and a plurality of optical switching elements. The optical waveguides in the example shown in FIG. 1, and in the orientation shown, are arranged as a grid comprising horizontally aligned waveguides and vertically aligned waveguides, and each output from the multiplexers is provided to a respective horizontally aligned waveguide. In some examples, the horizontally and vertically aligned waveguides may be in the same device layer or layers. At the intersection of at least some of the horizontal and vertical waveguides is located a respective optical switching element. The optical switching element is controllable to selectively direct the optical signal in the horizontally aligned waveguide into the vertically aligned waveguide, or allow it to pass along the horizontally aligned waveguide. In this way, the optical signal in a horizontally aligned waveguide can be directed into a selected one of the vertically aligned waveguides by activating one of the optical switching elements located along the horizontally aligned waveguide. Referring to the waveguides as horizontal and vertical is merely an example description of the orientation shown, and a particular orientation of the waveguides is not essential.

Each horizontally aligned waveguide accepts an optical signal from one of the multiplexers, the optical signal having a particular wavelength. Therefore, the horizontally aligned waveguide is associated with a particular wavelength. As there are N input signals, each having the same number of wavelengths in this example, there are N waveguides associated with a particular wavelength, each corresponding to a respective optical input signal 102. Therefore, in the example where each optical input signal comprises 48 wavelengths, there are 48N horizontally aligned waveguides. Additionally, there are M output signals from the add/drop and switching device 100, each of the M output signals comprising the same number of wavelengths as the input signals 102. Therefore, there are M groups of vertically aligned waveguides. In some examples, each vertically aligned waveguide may be intended to carry a single wavelength (therefore, in an example with 48 wavelengths, there may be 48M vertically aligned waveguides). However, in other examples, each vertically aligned waveguide may be intended to carry a plurality of wavelengths. For the example shown in FIG. 1, each output signal from the device 100 is associated with a group of four vertically aligned waveguides, and as such there are 4M vertically aligned waveguides. Therefore, each of the four vertically aligned waveguides in a group may carry twelve respective wavelengths, or the number of wavelengths carried may differ between each waveguide in the group.

The switching matrix 120 may in some examples comprise an optical switching device at the intersection of horizontally and vertically aligned wavelengths associated with the same wavelength, such that a signal in a horizontally aligned waveguide and having a particular wavelength can only be directed to one of the M vertically aligned waveguides associated with the same wavelength. Where a vertically aligned waveguide is to carry multiple wavelengths, the signal in the horizontally aligned waveguide may be directed into the waveguide intended to carry that wavelength. Not all of the horizontally and vertically aligned waveguides are shown in FIG. 1, for clarity.

Signals directed into the vertically aligned waveguides are directed towards respective routing apparatus, such as for example routing apparatus 130 and 132, and respective beam combining apparatus, such as for example band combining apparatus 140, which combine signals to form M output signals $150_1, \ldots, 150_N$. In the example shown, each band combining apparatus 140 receives two input signals from respective routing apparatus 130, 132. Each of the output signals 150 comprises a plurality of wavelengths, such as for example the same number of wavelengths as the input signals 102. In one example, each output signal 150 comprises 48 wavelengths corresponding to the wavelengths of the input signals 102. As such, therefore, in the example shown, the routing apparatus 130, 132 each receive a respective subset of the 48 optical signals and combine them to provide a respective combined signal to the respective band combiner 140, which combines the two signals to form the respective output signal 150, which is also known as a drop signal. If a signal corresponding to a particular wavelength in an input signal 102 is directed into one of the drop signals 150, it has effectively been removed or "dropped" from the input signal 102.

Figure 2:
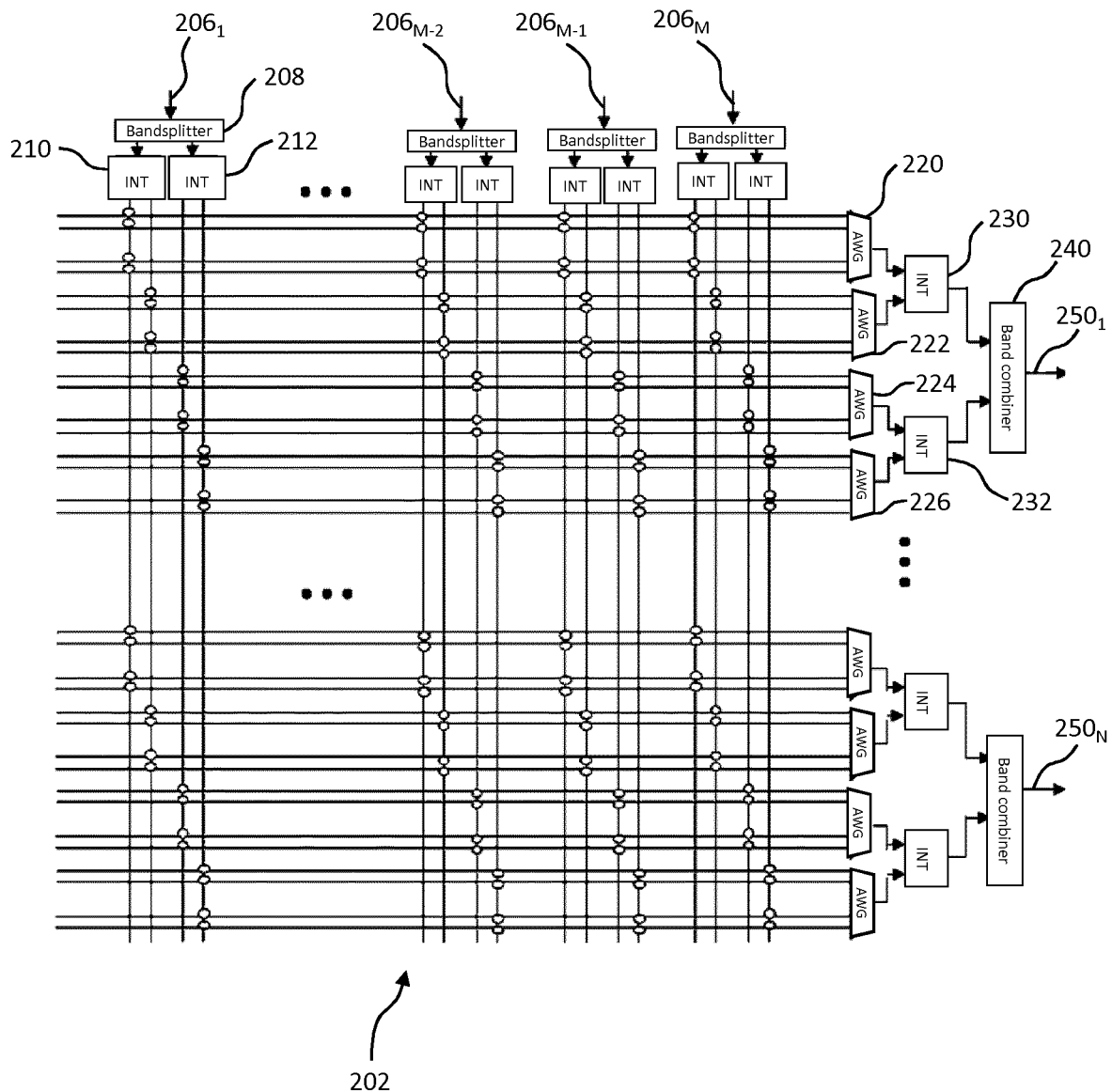
FIG. 2 is a schematic illustration of an example of an add switch device.

The example add switch device 200 of FIG. 2 includes a switching matrix 202 comprising a plurality of horizontally aligned waveguides, a plurality of vertically aligned waveguides, and a plurality of optical switching elements, arranged in a manner similar to the switching matrix 120 shown in FIG. 1. Again, the orientation of the waveguides corresponds to the orientation shown in FIG. 2 and a particular orientation of the waveguides is not required. Each horizontally aligned waveguide may be associated with a particular wavelength. For example, the switching matrix 202 has 48N corresponding horizontally aligned waveguides.

The add switch device 200 receives M optical input signals, also known as add signals, at a plurality of inputs $206_1, \ldots, 206_M$. Each input signal 206 is provided to a respective band splitter. For example, input signal $206_1$ is provided to band splitter 208. The band splitters separate the respective optical input signals 206 into two signals, each including respective wavelength ranges. In one example, one signal output from each band splitter comprises wavelengths 1 to 24 of the respective input signal 206, and another signal output from each band splitter comprises wavelengths 25 to 48.

The output signals from the band splitters are provided to respective routing apparatus. For example, the two output signals from the band splitter 208 are provided to the routing apparatus 210 and 212 respectively. Each routing apparatus separates its input signal into signals corresponding to separate wavelengths. Therefore, in one example, each of the routing devices 210 and 212 outputs 24 signals, each corresponding to a single wavelength of the input signal $206_1$. Each signal from the routing devices is provided to a respective one of the vertically aligned waveguides in the switching matrix 202. Hence, there are 48M waveguides in one example, or fewer where the vertically aligned waveguides each carry a plurality of wavelengths.

The optical switching elements of the switching matrix 202 are located at the intersection of waveguides corresponding to the same wavelength, similar to the switching matrix 120 of FIG. 1. Therefore, each switching device can be activated to direct the optical signal from the corresponding horizontal waveguide into the corresponding vertical waveguide. Alternatively, each switch device may be deactivated to allow the signals in the corresponding horizontally and vertically aligned waveguides to continue without being diverted to another waveguide. In this manner, each of the signals corresponding to a wavelength of an input signal 206 can be directed into a selected one of the horizontally aligned waveguides corresponding to the same wavelength. If no switching device along a particular vertically aligned waveguide is activated, the signal along that waveguide will continue along the waveguide and may be lost. This may occur for example when it is not required to add that particular signal using the add device 200.

As such, the add switch device 200 can effectively selectively replace a signal in each horizontally aligned waveguide with a signal from a vertically aligned waveguide. Signals in the horizontally aligned waveguides are provided to multiplexers. Outputs from the multiplexers are provided to routing apparatus, and outputs from the routing apparatus are provided to band combiners. Each band combiner receives signals from multiple routing apparatus, and each routing apparatus receives signals from multiple multiplexers. In one example, each multiplexer, such as multiplexers 220, 222, 224 and 226, receives twelve signals from corresponding waveguides, each signal corresponding to a particular wavelength. In the example shown, multiplexer 220 receives signals corresponding to odd numbered wavelengths 1, 3, . . . , 23, multiplexer 222 may receive signals corresponding to even numbered wavelengths 2, 4, . . . , 24, multiplexer 224 may receive signals corresponding to odd numbered wavelengths 25, 27, . . . , 47, and multiplexer 226 may receive signals corresponding to even numbered wavelengths 26, 28, . . . , 48. The routing apparatus 230 combines signals from multiplexers 220 and 222, and the routing apparatus 232 combines signals from multiplexers 224 and 226. The band combiner 240 combines signals from routing apparatus 230 and 232. As a result, output signal $250_1$ comprises a WDM signal including 48 wavelengths. Similarly, each output signal $250_1, \ldots, 250_N$ comprises a WDM signal including 48 wavelengths, in this example. Each output signal $250_1, \ldots, 250_N$ comprises the corresponding input signal $102_1, \ldots, 102_N$, without the signals of particular wavelengths that were removed by drop switch device 100, but including signals of particular wavelengths that were replaced by add switch device 200.

In the above description of FIGS. 1 and 2, optical signals are referred to; these may comprise modulated light received at an input, for example, or alternatively a signal may also comprise the absence of modulated light, for example if no light is received at an input, or if modulated light is not directed in a particular direction. Therefore, for example, in an example referred to above where an output (such as output $250_1$) comprises a combination of 48 optical signals, one or more of these optical signals may be modulated light signals, and/or one or more of these optical signals may be the absence of light, in which case the output is a combination of between zero and 48 modulated light signals.

In some examples, one or more of the optical switching elements within each switching matrix 120, 202 may be micro-ring resonators (MRRs), though in other examples alternative types of optical switching elements may be used.

The drop switch device 100 and add switch device may be integrated into a single device, such as an add/drop and switching aggregator (ADSA). In such a device, the inputs 102 may be referred to as input line ports, the outputs 250 may be referred to as output line ports, the inputs 206 may be referred to as add ports, and the outputs 150 may be referred to as drop ports.

In some implementations, the drop switch device 100 and/or the add switch device may be polarization sensitive. That is, one or both devices may operate only on one polarization state. Therefore, if an optical signal that is provided to an input of the devices that has a different polarization state or an incoherent polarization state, at least some of the energy in the signal may be wasted within the devices, reducing the efficiency or sensitivity of the devices.

Figure 3:
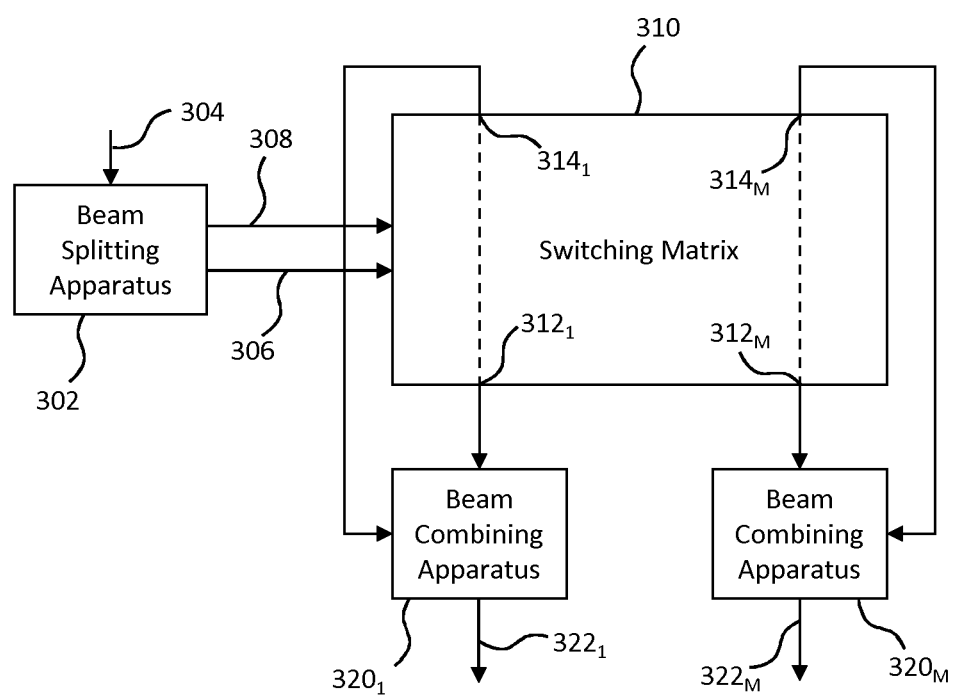
FIG. 3 is a schematic illustration of an example of an optical switching apparatus.

FIG. 3 shows an embodiment of an optical switching apparatus 300. The apparatus 300 includes a first beam splitting apparatus 302. This is configured to split a first optical input signal 304 into a first optical signal 306 and a second optical signal 308. The first optical signal 306 has the same or substantially the same polarization state as the second optical signal 308. That is, for example, the optical signals both comprise a TE mode signal, a TM mode signal, or some other polarization mode. However, the signals are polarized to a particular mode, or substantially to a particular mode. In some examples, the first beam splitting apparatus 302 forms the first optical signal 306 using components of the input signal 304 that have a first polarization state, and forms the second optical signal 308 using components of the input signal 306 that have a second polarization state, where the first and second polarization states are orthogonal or substantially orthogonal, such as TE and TM mode polarization states.

The first optical signal 306 and second optical signal 308 are provided to a switching matrix 310. The switching matrix 310 comprises M first matrix outputs (i.e. first outputs of the switching matrix) $312_1, \ldots, 312_M$ and M second matrix outputs (i.e. second outputs of the switching matrix) $314_1, \ldots, 314_M$. The example apparatus 300 shown in FIG. 3 has two first matrix outputs and two second matrix outputs, i.e. M=2, though in other examples M may be a higher integer. Each first output 312 is associated with a respective one of the second outputs 314, illustrated using dashed lines in FIG. 3. Therefore, for example, first output $312_1$ is associated with second output $314_1$.

The switching matrix 310 is configured to selectively direct the first optical signal 306 to a selected one of the first matrix outputs 312 and to selectively direct the second optical signal 308 to the second matrix output 314 associated with the selected first matrix output. So, for example, the switching matrix may be controlled to direct the first optical signal 306 to first matrix output $312_1$. At the same time, the second optical signal 308 will be directed to the associated second matrix output $314_1$. Alternatively, for example, the switching matrix may be controlled to direct the first optical signal 306 to first matrix output $312_M$. At the same time, the second optical signal 308 will be directed to the associated second matrix output $314_M$. Alternatively, in some examples, the switching matrix 310 may be controlled such that the optical signals 306 and 308 may be directed to none of the switching matrix outputs.

The optical switching apparatus 300 includes a plurality of beam combining apparatus $320_1, \ldots, 320_M$. Each beam combining apparatus 320 is configured to combine optical signals from a respective one of the first matrix outputs 312 and its associated second matrix output 314. For example, beam combining apparatus $320_1$ combines signals from outputs $312_1$ and $314_1$ of the switching matrix 310. Beam combining apparatus $320_M$ combines signals from outputs $312_M$ and $314_M$ of the switching matrix 310. Generally, beam combining apparatus $320_i$ combines signals from outputs $312_i$ and $314_i$ of the switching matrix 310, where i=1, ..., M. In this way, for example, the first and second optical signals 306 and 308 are provided to the switching matrix 310, and the switching matrix may redirect the two signals to the same beam combining apparatus 320. As the first and second optical signals 306 and 308 have the same or substantially the same polarization state, this state can be selected to be the state to which the switching matrix is the most sensitive. However, the input signal 304 may have an arbitrary polarization state, a polarization state other than the state to which the matrix 310 is most sensitive, a mixture of polarization states, or an incoherent polarization state. As such, the optical switching apparatus 300 may for example be polarization insensitive or substantially polarization insensitive. Each beam combining apparatus $320_1, \ldots, 320_M$ may in some examples be configured to combine the signals in such a way as to provide respective outputs $322_1, \ldots, 322_M$ that have a similar polarization state as the input signal 304.

In some examples, the optical switching apparatus 300 may include at least one additional beam splitting apparatus configured to receive a respective optical input signal and split the respective optical input signal into two optical signals, wherein the two optical signals have the same or substantially the same polarization state as each other. Therefore, the apparatus 300 includes multiple inputs for multiple optical input signals. The switching matrix 310 may therefore be configured to, for each additional beam splitting apparatus, selectively direct one of the two optical signals from the beam splitting apparatus to a respective selected one of the first matrix outputs 312 and to selectively direct the other of the two optical signals to the second matrix output 314 associated with the respective selected first matrix output 312. Therefore, the switching matrix 310 may selectively direct the two optical signals to the same beam combining apparatus 320. This may be a different beam combining apparatus 320 than the beam splitting apparatus 320 to which the optical signals 306 and 308 are directed. Alternatively, in some examples, the two optical signals from the at least one additional beam splitting apparatus may be selectively directed to none of the outputs 312, 314 of the switching matrix 310.

In some examples, the switching matrix may be controlled such that the optical signals 306 and 308 may be directed to a selected one of a first subset of the matrix outputs 312 and 314. This may be the case for example where the signals 306 and 308 are of a particular wavelength and the matrix outputs 312 and 314 are associated with respective particular wavelengths—the matrix 310 may selectively direct the signals 306 and 308 to an output associated with the same wavelength. Other input signals (such as provided to the at least one additional beam splitting apparatus) may be associated with other respective wavelengths, and therefore may be directed to a respective subset of the outputs 312, 314 of the matrix 310 that may be the same as the first subset, partially overlap the first subset, or different to the first subset such that the subsets do not include any of the same outputs 312, 314.

Figure 4:
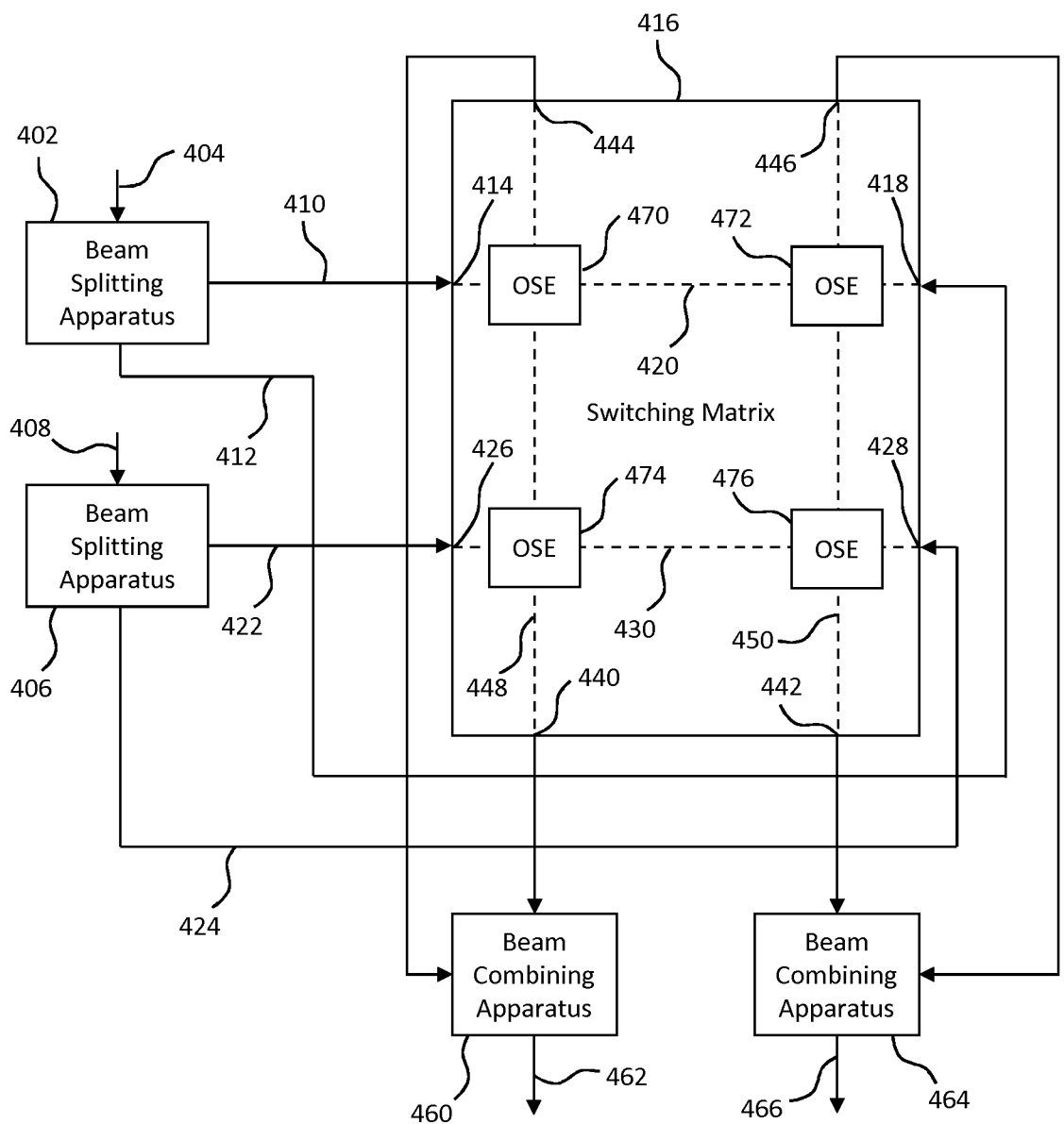
FIG. 4 is a schematic illustration of another example of an optical switching apparatus.

FIG. 4 shows an example of an embodiment of an optical switching apparatus 400. The apparatus 400 includes a first beam splitting apparatus 402 configured to receive a first optical input signal 404, and a second beam splitting apparatus 406 configured to receive a second optical input signal 408. In a more general embodiment, an optical switching apparatus may comprise N inputs and M outputs. Therefore, in the example apparatus 400 of FIG. 4, N=2 and M=2.

The first beam splitting apparatus 402 splits the first optical input signal 404 into a first optical signal 410 and a second optical signal 412, where the first and second optical signals 410 and 412 have the same or substantially the same polarization state. The first optical signal 410 is provided to an input 414 of a switching matrix 416, and the second optical signal 412 is provided to an input 418 of the switching matrix, where the input 418 is associated with the input 414. An optical waveguide 420 extends between the inputs 414 and 418.

The second beam splitting apparatus 406 splits the second optical input signal 408 into a third optical signal 422 and a fourth optical signal 424, where the third and fourth optical signals 422 and 424 have the same or substantially the same polarization state. The third and fourth optical signals 422 and 424 may also have the same or substantially the same polarization state as the first and second optical signals 410 and 412. The third optical signal 422 is provided to an input 426 of switching matrix 416, and the second optical signal 424 is provided to an input 428 of the switching matrix, where the input 428 is associated with the input 426. An optical waveguide 430 extends between the inputs 426 and 428.

The switching matrix 416 comprises two first outputs 440 and 442, and respective associated second outputs 444 and 446. An optical waveguide extends between a pair of associated outputs. For example, optical waveguide 448 extends between outputs 440 and 444, and optical waveguide 450 extends between outputs 442 and 446.

A first beam combining apparatus 460 combines signals from associated outputs 440 and 444 of the switching matrix 416 to form output signal 462. Similarly, a second beam combining apparatus 464 combines signals from associated outputs 442 and 446 to form output signal 466.

The switching matrix 416 includes a plurality of optical switching elements such as MRRs. In the example shown, an optical switching element is located at each intersection between "input" waveguides (i.e. waveguides 420 and 430) and "output" waveguides (i.e. waveguides 448 and 450) to allow optical signals on each of the input waveguides to be directed to a selected one of the output waveguides. For example, optical switching element (OSE) 470 is located at the intersection of waveguides 420 and 448, OSE 472 is located at the intersection of waveguides 420 and 450, OSE 474 is located at the intersection of waveguides 430 and 448, and OSE 476 is located at the intersection of waveguides 430 and 450.

Figure 5:
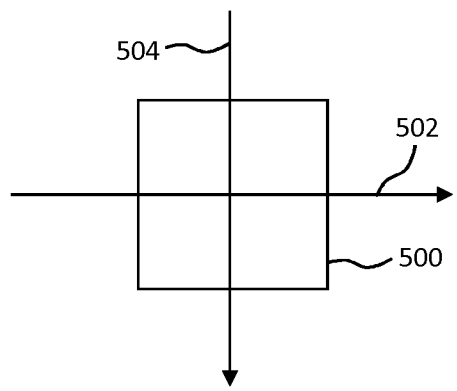
FIG. 5 is a schematic illustration of an example of an optical switching element in an "off" mode.

FIG. 5 shows an example of an optical switching element 500. The optical switching element may be, for example, an optical switching element 470, 472, 474 and/or 476 as shown in FIG. 4. The optical switching element may be located at the intersection of two optical waveguides (not shown). The device 500 may receive a first optical signal 502 from a first direction. In the orientation shown in FIG. 5, the first optical signal 502 is received on the left of the device 500. The device 500 may also receive a second optical signal 504, for example from above the device 500 in the orientation shown. The device 500 is in an "off" mode or state, meaning that the optical signals 502 and 504 pass through the device 500 with their respective directions unchanged or substantially unchanged.

Figure 6:
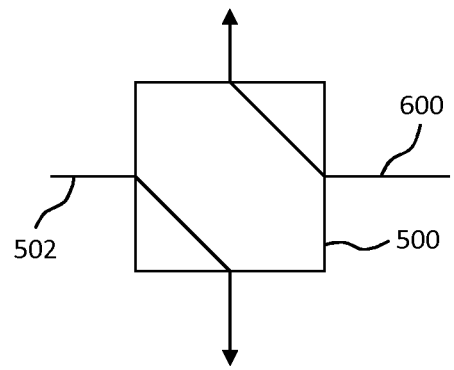
FIG. 6 is a schematic illustration of the optical switching element in an "on" mode.

FIG. 6 shows the optical switching element 500 in an "on" mode or state. In this state, the first optical signal 502 received at the left of the device 500 in the orientation shown is directed downwards. Another optical signal 600 received from the right of the device 500 in the orientation shown is directed upwards.

In a similar manner, any optical signals received at the top or bottom of the device 500 are directed to the right and left of the device, respectively, though in practice a switching matrix that includes one or more devices 500 may be configured such that an optical signal is not received at the top or bottom (in the orientation shown) whilst the device 500 is in an "on" state. That is, for example, other optical switching elements may be configured so that the device 500 does not receive an optical signal at the top or bottom whilst in the "on" state. Similarly, the device 500 may not receive an optical signal at the right or bottom whilst in the "off" state.

Figure 7:
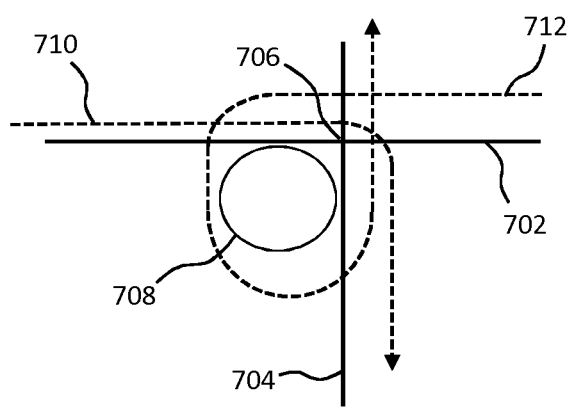
FIG. 7 is a schematic illustration of an example of a micro ring resonator (MRR) in an "on" mode.
Figure 8:
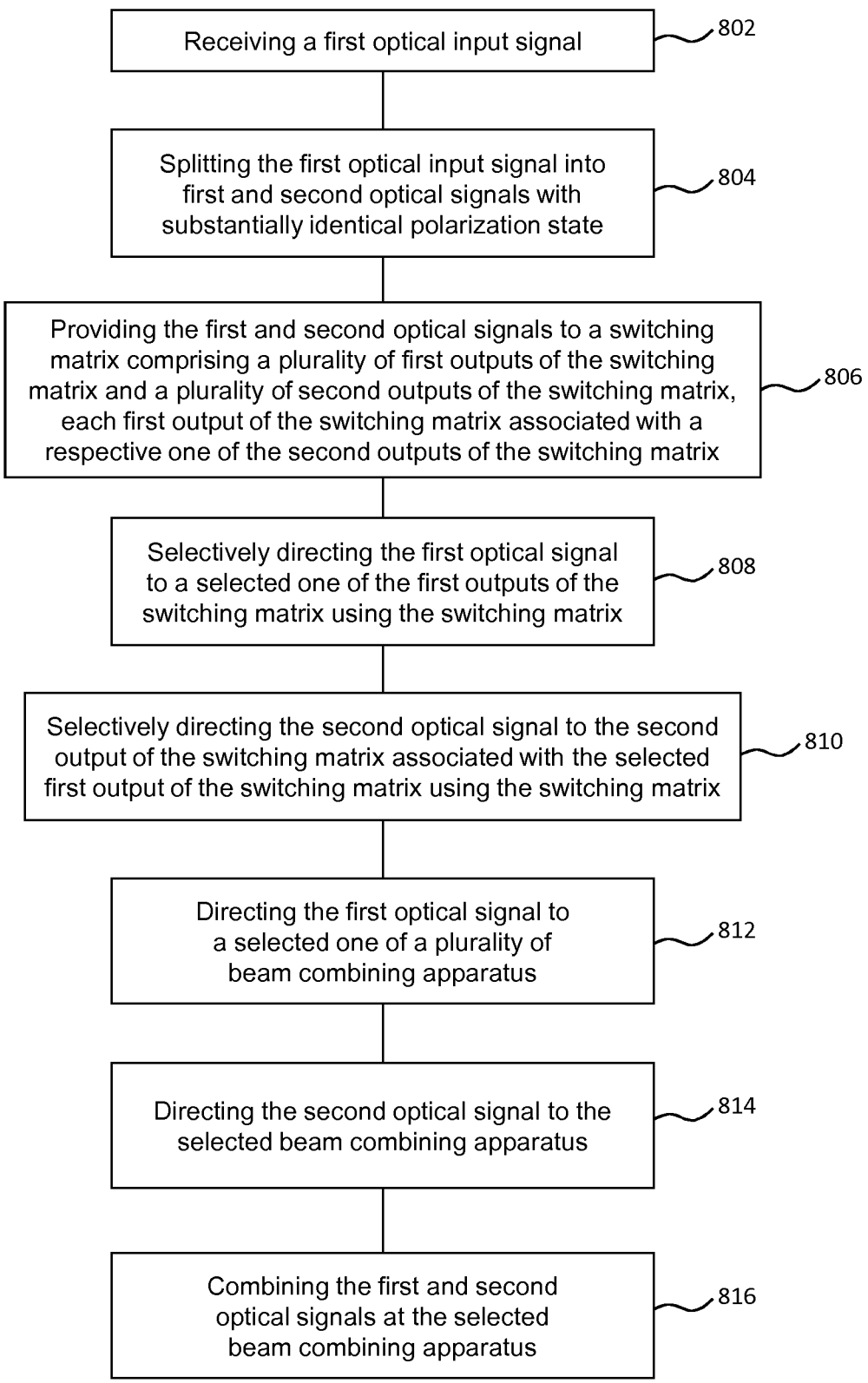
FIG. 8 is a flow chart of an example of an optical switching method.

FIG. 7 shows an example of a micro ring resonator (MRR) 700, which may be an optical switching element, in an "on" state. The MRR 700 comprises a pair of optical waveguides 702 and 704 that cross to form an intersection 706. A closed loop optical waveguide ring 708 is located proximate the waveguides 702 and 704 and the intersection 706. An optical signal travelling from left to right along the waveguide 702, in the orientation shown in FIG. 7, will be directed downwards, as shown by dashed arrow 710, into the optical waveguide 704 via the ring 708. For example, the optical signal will be coupled into the ring 708 in a clockwise direction, and subsequently be couple into the waveguide 704. Similarly, an optical signal travelling from right to left along the waveguide will be directed upwards into the optical waveguide 712 via the ring 708, as illustrated by arrow 712.

Referring back to the optical switching apparatus of FIG. 4, the operation of the apparatus 400 is as follows. It may be desired, for example, to direct the first optical input signal 404 to output 466 of the apparatus 400. Therefore, OSE 470 is controlled to allow optical signal 410 in waveguide 420 to pass through towards OSE 472. OSE 472 is controlled to direct optical signal 410 on input waveguide 420 into output waveguide 450 towards output 442 of the switching matrix 416 (i.e. in a downward direction, in the example orientation shown). Consequently, the OSE 472 also directs optical signal 412 on input waveguide 420 onto the same output waveguide 450, but in the opposite direction towards switching matrix output 446 (i.e. in an upward direction, in the example orientation shown). OSE 476 is controlled to allow the optical signal 410 in output waveguide 450 to pass through towards switching matrix output 442. As a result, the optical signals 410 and 412 are combined at beam combining apparatus 464 to form output signal 466.

Similarly, OSE 474 can be controlled to direct optical signals 422 and 424 formed from the second optical input signal 408 to the beam combining apparatus 460 to form output signal 462. In this case, OSE 476 is already configured to allow optical signal 424 to pass through towards OSE 474.

The apparatus 300, 400 shown in FIGS. 3 and 4 may be used as a drop switch. Alternatively, for example, some embodiments may be used as an add switch.

In other examples of an optical switching apparatus, there may be more optical input signals (i.e. N input signals) and/or more output signals (i.e. M output signals). In such cases, the switching matrix may include more input waveguides and/or output waveguides as appropriate. The switching matrix may include an optical switching element at each intersection of input and output waveguides, or may include fewer optical switching elements such that each input signal to the apparatus may be directed to a respective subset of the output signals from the apparatus. This may be the case where each input signal and each output signal are associated with respective wavelengths. Therefore, for example, optical switching elements may be included such that an input signal associated with a particular wavelength can only be directed to an output associated with the same wavelength.

Figure 11:
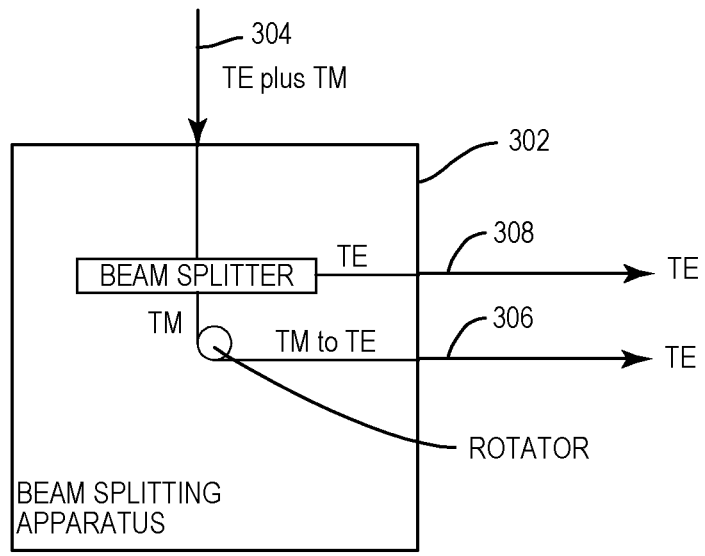
FIG. 11 is a schematic illustration of a phase rotating beam splitting apparatus.

Each beam splitting apparatus may in some examples comprise a polarization beam splitter that splits an input signal into two signals having orthogonal polarization states, such as TE and TM modes for example. Each beam splitting apparatus may also include a polarization rotator to rotate the polarization state to its orthogonal state, such that the two signals provided from the beam splitting apparatus may have the same or substantially the same polarization state as each other. For example, the polarization rotator may rotate a signal from the beam splitter having TM mode polarization, such that both signals provided by the beam splitting apparatus have TE mode polarization, e.g., as shown in FIG. 11. The beam splitter may comprise, for example, a polarization splitting grating coupler (PSGC) that also couples the signals into the switching matrix and the polarization rotator as appropriate.

Figure 12:
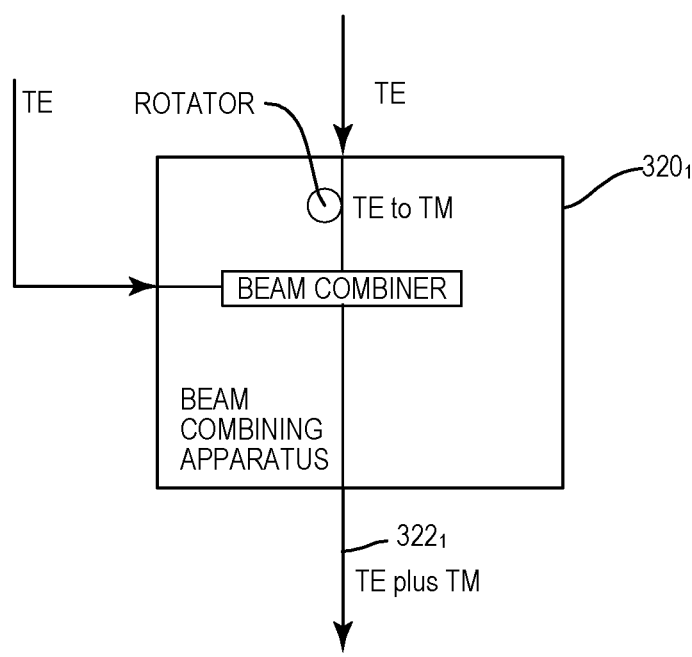
FIG. 12 is a schematic illustration of a phase rotating beam combining apparatus.

Each beam combining apparatus may in some examples comprise a beam combiner (that may be similar to for example a beam splitter in a beam splitting apparatus) to combine two signals into a single output signal. Each beam splitting apparatus may also include a polarization rotator to rotate one of its input signals to its orthogonal state, such that the two signals provided to the beam combiner may have orthogonal or substantially orthogonal polarization states, e.g., as shown in FIG. 12. For example, the beam combining apparatus may be provided with two TE mode signals. The polarization rotator may rotate one of the signals to a TM mode signal, and provide the signals with orthogonal polarization states to the beam combiner. The beam combiner may comprise, for example, a polarization splitting grating coupler (PSGC) that also couples the signals from the switching matrix and the polarization rotator as appropriate into the PSGC.

Some examples of optical switching apparatus may include wavelength separation apparatus to separate an optical input signal into a number of separate signals, each of one or more respective wavelengths. The wavelength separation apparatus may include, for example, band splitters, routing devices and/or demultiplexers, and may be similar to those shown in FIG. 1. The beam splitting apparatus of embodiments of this disclosure may be located between the wavelength selection apparatus and the switching matrix, in which case there may be as many beam splitting apparatus as there are pairs of associated inputs to the switching matrix. Alternatively, the beam splitting apparatus may be located before the wavelength separation apparatus, in which case there may be as many beam splitting apparatus as there are input signals to the optical switching apparatus. In other alternative embodiments, beam splitting apparatus may be located within the wavelength separation apparatus, for example between a beamsplitter and routing apparatus, or between routing apparatus and a demultiplexer. Similarly, some examples of optical switching apparatus may additionally or alternatively include wavelength combining apparatus for combining optical signals of respective wavelengths into combined optical signals. The wavelength combining apparatus may include, for example, multiplexers and routing apparatus similar to those shown in FIG. 1. Beam combining apparatus may be located before or after, or within, the wavelength combining apparatus.

8 5 shows an embodiment of a method 800 of switching optical signals. Step 802 of the method 800 comprises receiving a first optical input signal. In step 804, the first optical input signal is split into first and second optical signals with substantially the same polarization state as each other, such as for example the TE or TM polarization state. In some examples, splitting the input signal comprises splitting the signal into two signals with orthogonal or substantially orthogonal polarization states, and rotating the polarization of one of the signals to its orthogonal polarization state, to form the first and second optical signals.

Step 806 comprises providing the first and second optical signals to a switching matrix comprising a plurality of first matrix outputs and a plurality of second matrix outputs, each first matrix output associated with a respective one of the second matrix outputs. The switching matrix could be, for example, the switching matrix 320 shown in FIG. 3 or the switching matrix 416 shown in FIG. 4, or any other suitable switching matrix.

Step 808 of the method 800 comprises selectively directing the first optical signal to a selected one of the first matrix outputs using the switching matrix. In step 810, the method 800 comprises selectively directing the second optical signal to the second matrix output associated with the selected first matrix output using the switching matrix. Step 812 comprises directing the first optical signal from the selected one of the first matrix outputs to a selected one of a plurality of beam combining apparatus, and step 814 comprises directing the second optical signal from the second matrix output associated with the selected first matrix output to the selected beam combining apparatus.

Step 816 of the method 800 comprises combining the first and second optical signals at the selected beam combining apparatus. In some examples, this may comprise rotating one of the signals to its orthogonal polarization state, such that the two signals thus have the same or substantially the same polarization state as each other, and combining the two signals using a beam combiner.

In some embodiments, a method of switching optical signals further comprises receiving a second optical input signal and splitting the second optical input signal into third and fourth optical signals with substantially the same polarization state. The method may also comprise directing the third optical signal to a further selected one of the plurality of beam combining apparatus, directing the fourth optical signal to the further selected beam combining apparatus, and combining the third and fourth optical signals at the selected beam combining apparatus. Thus the method can be used to switch multiple input signals to respective selected beam combining apparatus and hence to selected outputs from, for example, a device implementing the method. The method may comprise rotating the polarization of the third or fourth optical signal such that they have substantially orthogonal polarization states, and subsequently combining the third and fourth optical signals with substantially orthogonal polarization states using a beam combiner.

Figure 9:
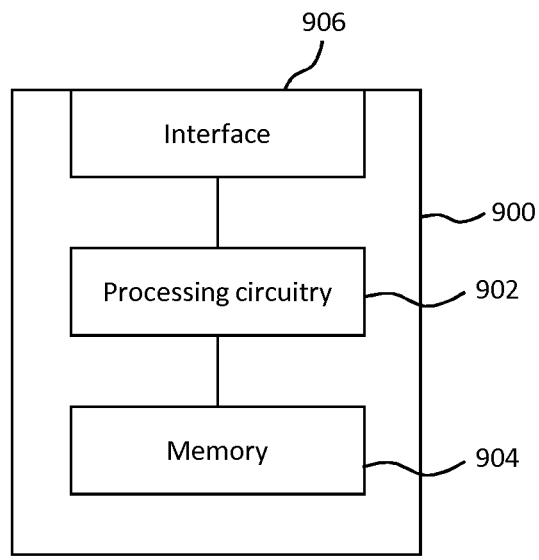
FIG. 9 is a schematic illustration of an example of an optical switching apparatus.

FIG. 9 shows an example of apparatus 900 according to embodiments of the disclosure. The apparatus 900 may be an optical switching apparatus, such as for example an add switch device or a drop switch device. The apparatus 900 may be configured to perform the method of FIG. 5.

The apparatus 900 comprises processing circuitry 902 (e.g. a processor) and a memory 904 in communication with the processing circuitry 902. The memory 904 contains instructions executable by the processor 902. The apparatus 900 also comprises an interface 906 in communication with the processing circuitry 902. Although the interface 906, processing circuitry 902 and memory 904 are shown connected in series, these may alternatively be interconnected in any other way, for example via a bus.

In one embodiment, the memory 904 containing instructions executable by the processor 902 such that the apparatus is operable to is operable to: receive a first optical input signal; split the first optical input signal into first and second optical signals with substantially the same polarization state; provide the first and second optical signals to a switching matrix comprising a plurality of first matrix outputs and a plurality of second matrix outputs, each first matrix output associated with a respective one of the second matrix outputs; selectively direct the first optical signal to a selected one of the first matrix outputs using the switching matrix; selectively direct the second optical signal to the second matrix output associated with the selected first matrix output using the switching matrix; direct the first optical signal from the selected one of the first matrix outputs to a selected one of a plurality of beam combining apparatus; direct the second optical signal from the second matrix output associated with the selected first matrix output to the selected beam combining apparatus; and combine the first and second optical signals at the selected beam combining apparatus.

Figure 10:
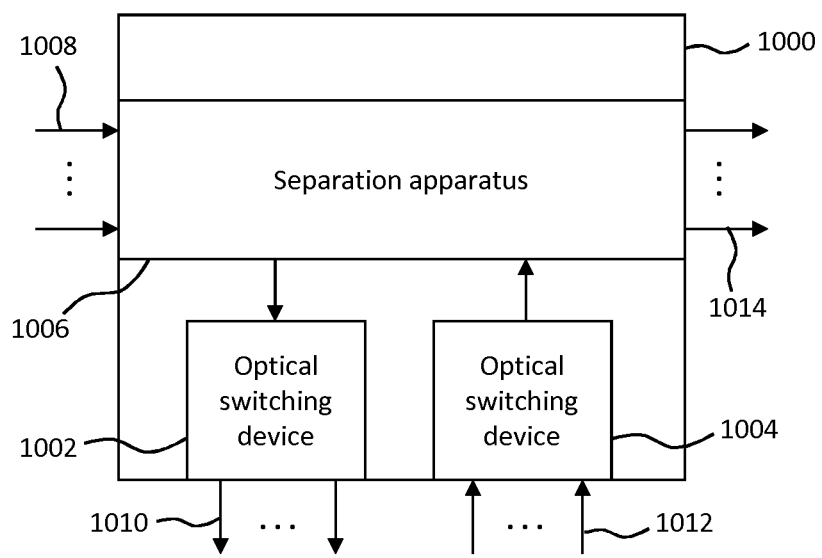
FIG. 10 is a schematic illustration of an example of an optical add drop multiplexer.

FIG. 10 shows an example of an optical add/drop multiplexer 1000. The multiplexer includes a first optical switching apparatus 1002 and a second optical switching apparatus 1004. Each of the first optical switching apparatus 1002 and/or 1004 may comprise, for example, an optical switching apparatus as shown in FIG. 3, 4 or 9. The multiplexer 1000 also includes separation apparatus 1006 that receives input signals 1008 in the form of wavelength multiplexed optical signals. The separation apparatus 1006 separates certain wavelengths, such as for example selected wavelengths corresponding to selected signals multiplexed in the input signals, from the input signals and provides these wavelengths to first optical switching device 1002, which may be referred to as a drop switch device. The first optical switching device 1002 provides outputs 1010, which may be drop ports for example. Therefore, in some embodiments, the first optical switching device 1002 receives inputs from the separation apparatus 1006 and provides each of them to a selected drop port.

The second optical switching device 1004 receives optical input signals 1012, for example from add ports, and provides those signals to the separation apparatus 1006. The second optical switching device 1004 may switch the signals in a way such that the separation apparatus 1006 adds them to selected signals to form outputs 1014 of the add/drop multiplexer 1000. Any signals or wavelengths in the input signals 1008 that are not directed to drop ports may pass through to the output signals 1014.

Advantages provided by embodiments of the disclosure include wavelength insensitivity (or, improved sensitivity to at least some wavelengths) of an optical switching device, apparatus or method.

In at least some of the other embodiments, other components may be present, which are not shown. For example, optical couplers for coupling optical signals between components, optical waveguides or fibers for conveying optical signals between components or nodes, and/or control systems for controlling the switching matrix and/or the optical switching elements therein may be present. In any of the above embodiments, an optical switching element may comprise a micro ring resonator (MRR) or any other suitable optical switching element.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. An optical switching apparatus, comprising:
   a first beam splitting apparatus configured to split a first optical input signal into a first optical signal and a second optical signal, wherein the first optical signal has substantially the same polarization state as the second optical signal;
   a switching matrix comprising:
      an input optical waveguide comprising a first input end and a second input end opposing the first input end, the input optical waveguide configured to receive the first and second optical signals from the first beam splitting apparatus at the first and second input ends, respectively;
      a plurality of output optical waveguides, each comprising a first output end and a second output end associated with the first output end; and
      a plurality of switching elements, each disposed at a respective intersection of the input optical waveguide and one of the output optical waveguides;
   wherein the switching matrix is configured to selectively use one of the switching elements to direct the first optical signal and the second optical signal from the input optical waveguide to the first output end and the second output end, respectively, of the output optical waveguide that intersects the input optical waveguide at the selected switching element; and
   a plurality of beam combining apparatus, each beam combining apparatus configured to combine optical signals from a respective one of the first output ends and its associated second output end.

2. The optical switching apparatus of claim 1, wherein the switching elements comprise micro ring resonators.

3. The optical switching apparatus of claim 1, wherein the first beam splitting apparatus comprises a beam splitter and a polarization rotator.

4. The optical switching apparatus of claim 1, wherein each beam combining apparatus comprises:
   a polarization rotator configured to rotate a polarization state of an optical signal from one of the output ends of one of the output optical waveguides into its orthogonal polarization state; and
   a beam combiner configured to combine the optical signals from the one of the output optical waveguides after the rotation by the polarization rotator.

5. The optical switching apparatus of claim 1, further comprising:
- at least one additional beam splitting apparatus, each additional beam splitting apparatus being configured to split a respective optical input signal into two optical signals that have substantially the same polarization state;
- for each additional beam splitting apparatus, an additional corresponding input optical waveguide comprising two opposing input ends and configured to respectively receive the two optical signals split by the additional beam splitting apparatus at the two opposing input ends; and
- a plurality of further switching elements, each disposed at a respective further intersection of one of the additional input optical waveguides and one of the output optical waveguides;
- wherein the switching matrix is further configured to, for each additional input optical waveguide, selectively use a respective further switching element to direct the two optical signals from the additional input optical waveguide to the first output end and the second output end of the output optical waveguide that intersects the additional input optical waveguide at the selected further switching element.

6. The optical switching apparatus of claim 3, wherein each of the beam splitting apparatus comprises a beam splitter and a polarization rotator.

7. A method of switching optical signals, the method comprising:
- receiving a first optical input signal;
- splitting the first optical input signal into a first optical signal and a second optical signal, wherein the first optical signal has substantially the same polarization state as the second optical signal;
- receiving the first optical signal and the second optical signal at a first input end and a second input end, respectively, of an input optical waveguide of a switching matrix, wherein the second input end opposes the first input end, and the switching matrix comprises:
  - the input optical waveguide;
  - a plurality of output optical waveguides, each comprising a first output end and a second output end associated with the first output end; and
  - a plurality of switching elements, each disposed at a respective intersection of the input optical waveguide and one of the output optical waveguides;
- selectively using one of the switching elements to direct the first optical signal from the input optical waveguide to a selected one of the first output ends and to direct the second optical signal to the second output end associated with the selected first output end;
- directing the first optical signal from the selected one of the first output ends to a selected one of a plurality of beam combining apparatus;
- directing the second optical signal from the second output end associated with the selected first output end to the selected beam combining apparatus; and
- combining the first and second optical signals at the selected beam combining apparatus.

8. The method of claim 7, wherein the splitting the first optical input signal comprises:
- splitting the first optical input signal into the first and second optical signals; and
- rotating the polarization of either the first optical signal or the second optical signal such that the first and second optical signals have substantially the same polarization state.

9. The method of claim 7, further comprising:
- receiving a second optical input signal;
- splitting the second optical input signal into third and fourth optical signals with substantially the same polarization state;
- directing the third optical signal to a further selected one of the plurality of beam combining apparatus;
- directing the fourth optical signal to the further selected beam combining apparatus; and
- combining the third and fourth optical signals at the selected beam combining apparatus.

10. The method of claim 9, wherein the combining the third and fourth optical signals at the selected beam combining apparatus comprises:
- rotating the polarization of the third or fourth optical signal such that the third and fourth optical signals have substantially orthogonal polarization states; and
- combining the third and fourth optical signals with substantially orthogonal polarization states using a beam combiner.

11. The method of claim 7, wherein the combining the first and second optical signals at the selected beam combining apparatus comprises:
- rotating the polarization of the first or second optical signal such that the first and second optical signals have substantially orthogonal polarization states; and
- combining the first and second optical signals with substantially orthogonal polarization states using a beam combiner.

* * * * *